United States Patent [19]

Nyezdatny

[11] Patent Number: 5,235,869
[45] Date of Patent: Aug. 17, 1993

[54] VALVE CONTROL FOR VEHICLE AND STATIONARY EQUIPMENT

[75] Inventor: Mark Nyezdatny, Temple City, Calif.
[73] Assignee: Adams Rite Manufacturing Company, City of Industry, Calif.
[21] Appl. No.: 855,554
[22] Filed: Mar. 23, 1992
[51] Int. Cl.$^5$ .................... G05G 9/00; G05G 5/06; F16C 1/12
[52] U.S. Cl. ................ 74/471 XY; 74/527; 74/475; 74/523; 74/501.6
[58] Field of Search ............ 74/527, 475, 471 XY, 74/483 R, 473 R, 523, 524, 525, 501.6, 476

[56] References Cited

U.S. PATENT DOCUMENTS

| | | | |
|---|---|---|---|
| 4,338,828 | 7/1982 | Ruhlman | 74/475 |
| 4,554,818 | 11/1985 | Kuehling | 74/527 X |
| 4,793,198 | 12/1988 | Myer | 74/471 XY |
| 4,821,600 | 4/1989 | Griffiths | 74/527 X |
| 4,960,147 | 10/1990 | Diamond | 74/527 X |
| 5,129,277 | 7/1992 | Lautzenhiser | 74/471 XY |
| 5,142,931 | 9/1992 | Menahem | 74/471 XY |
| 5,150,633 | 9/1992 | Hillgartner | 74/475 |
| 5,156,065 | 10/1992 | Fujimoto et al. | 74/527 |

FOREIGN PATENT DOCUMENTS 9115864 10/1991 PCT Int'l Appl. .............. 74/527

*Primary Examiner*—Vinh T. Luong
*Attorney, Agent, or Firm*—William W. Haefliger

[57] ABSTRACT

An apparatus for selectively controlling endwise movement of two control members comprising first structure including body structure supporting the members for selective endwise movement thereof; actuator structure coupled to the members for selectively moving the members endwise; and lock structure selectively movable into locking relation with the members to selectively block endwise movement thereof.

14 Claims, 5 Drawing Sheets

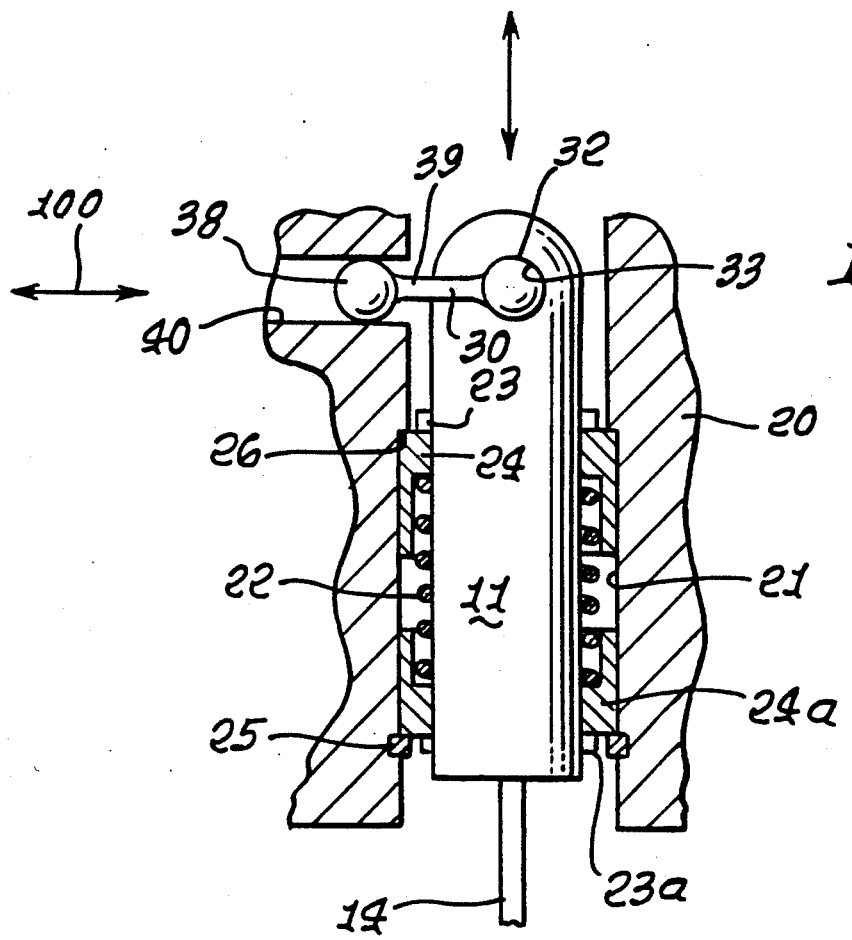

VALVE CONTROL FOR VEHICLE AND STATIONARY EQUIPMENT

BACKGROUND OF THE INVENTION

This invention relates generally to valve control apparatus, and in particular to apparatus of the type wherein multiple control members are moved back and forth to control valve spools and similar equipment.

There is need for simple, efficient apparatus of the type referred to for controlling valving elements. Such spools may, for example, have multiple axial positions into which they ar moved by actuator means, such as operator control handles. At times, it is desirable to lock the spools in selected position; and accordingly, there is need for simple, efficient locking means to accomplish this objective. There is also need for reliable, simple, compact, and easily operated apparatus of the type referred to.

SUMMARY OF THE INVENTION

It is a major object of the invention to provide improved apparatus of the type referred to above. Basically, the apparatus of the invention selectively controls endwise movement of at least two control members, and the apparatus comprises:

a) first means including body structure supporting the members for selective endwise movement thereof, b) actuator means coupled to the members for selectively moving the members endwise, c) and lock means selectively movable into locking relation with the members to selectively block endwise movement thereof.

It is another object of the invention to provide the actuator means to include structure having a first tongue and groove connection with a first of the two control members, and a second tongue and groove connection with a second of the two control members.

A further object of the invention includes the provision of a pivot on the body structure for pivotally supporting the actuator means, whereby, when the actuator means is tilted in one direction, the first control member is moved downwardly and the second control member is moved upwardly; and when the actuator member is tilted in another direction, the first control member is moved upwardly and the second control member is moved downwardly.

As will be seen, the lock means is typically selectively movable into locking relation with the actuator means proximate the tongue and groove connections. For example, the lock means may advantageously have locking elements for interlocking with arms defined by the actuator means structure, one of the elements sized to interlock with one arm before the other of the elements interlocks with the second arm when the locking means elements are moved sidewardly toward the arms. Also the locking means may include a control handle having a first position in which neither of the locking elements interlocks with the arms; a second position in which one of the elements interlocks with one of the arms; and a third position in which one of the elements interlocks with one of the arms, and the other of the elements interlocks with the other of the arms. In this regard, the locking means may include motion transfer mechanism for effecting sideward movement of the locking elements in response to rotation of the arm between the defined positions. That mechanism may include a carrier for the arms having a shaft portion movable sidewardly with the elements, a sleeve about the shaft portion and operatively connected to the handle, and a spiral tongue and groove connection between the sleeve and the shaft portion, the carrier mounted on the body structure for sideward movement, and the control handle also mounted on the body structure.

Another object includes the provision of the actuator means to have arms with tongue and groove connections with the members, the locking elements formed as hooks movable into interlocking relation with the arms, respectively. Also, the actuator means may include an elongated handle connected with the arms, with a pivot means provided o the body structure for pivotally mounting the elongated handle, whereby handle pivoting effects controlled pivoting of the arms to selectively move the members endwise.

These and other objects and advantages of the invention, as well as the details of an illustrative embodiment, will be more fully understood from the following specification and drawings, in which:

DRAWING DESCRIPTION

FIG. 8 is a vertical section showing a spring bias of a control member;

FIG. 9 is a table; and

FIG. 10 is a perspective view of locking hook elements.

DETAILED DESCRIPTION

Figure 1:
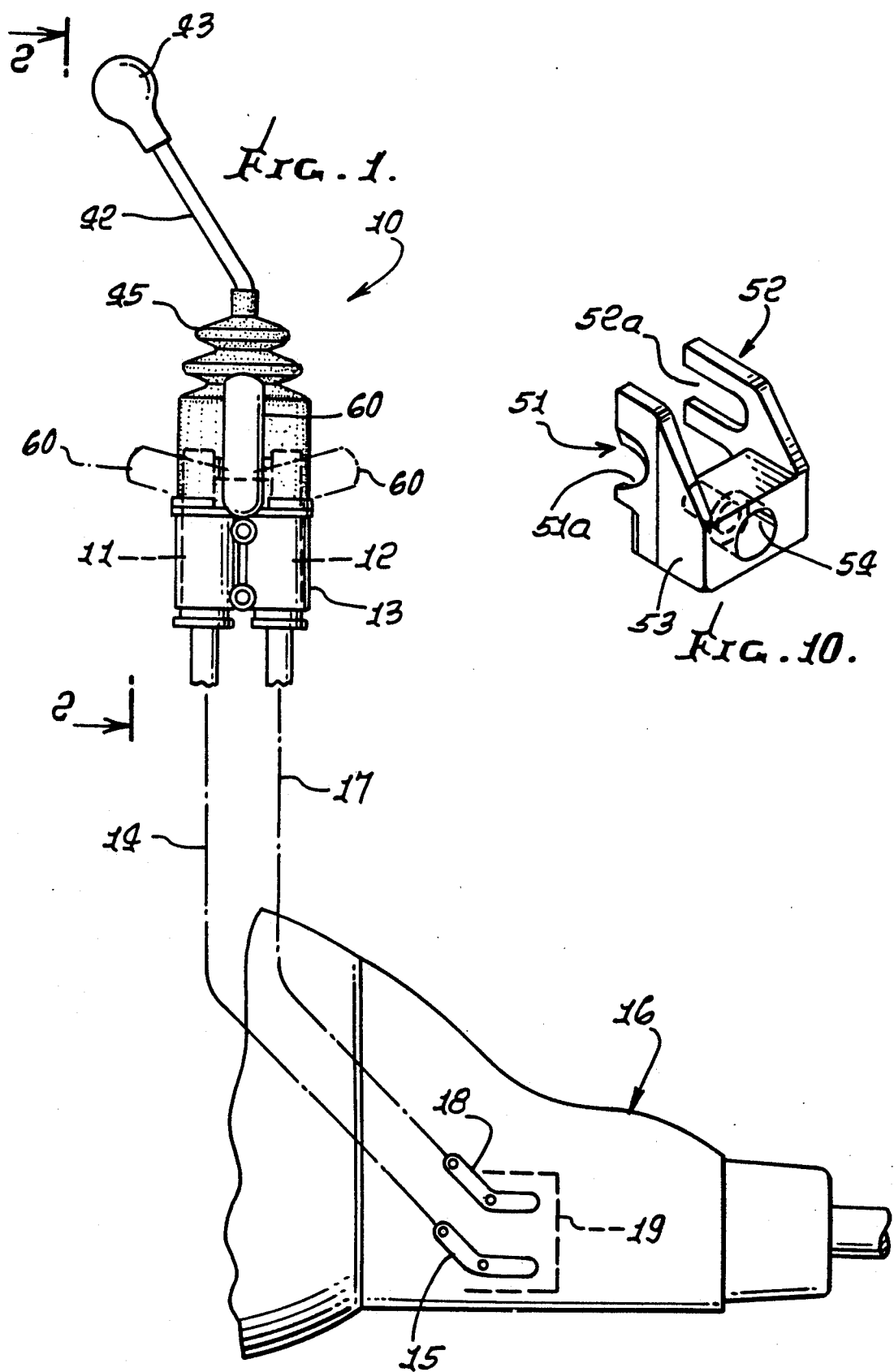
FIG. 1 is an elevation showing apparatus incorporating the invention connected to transmission control valve structure.
Figure 2:
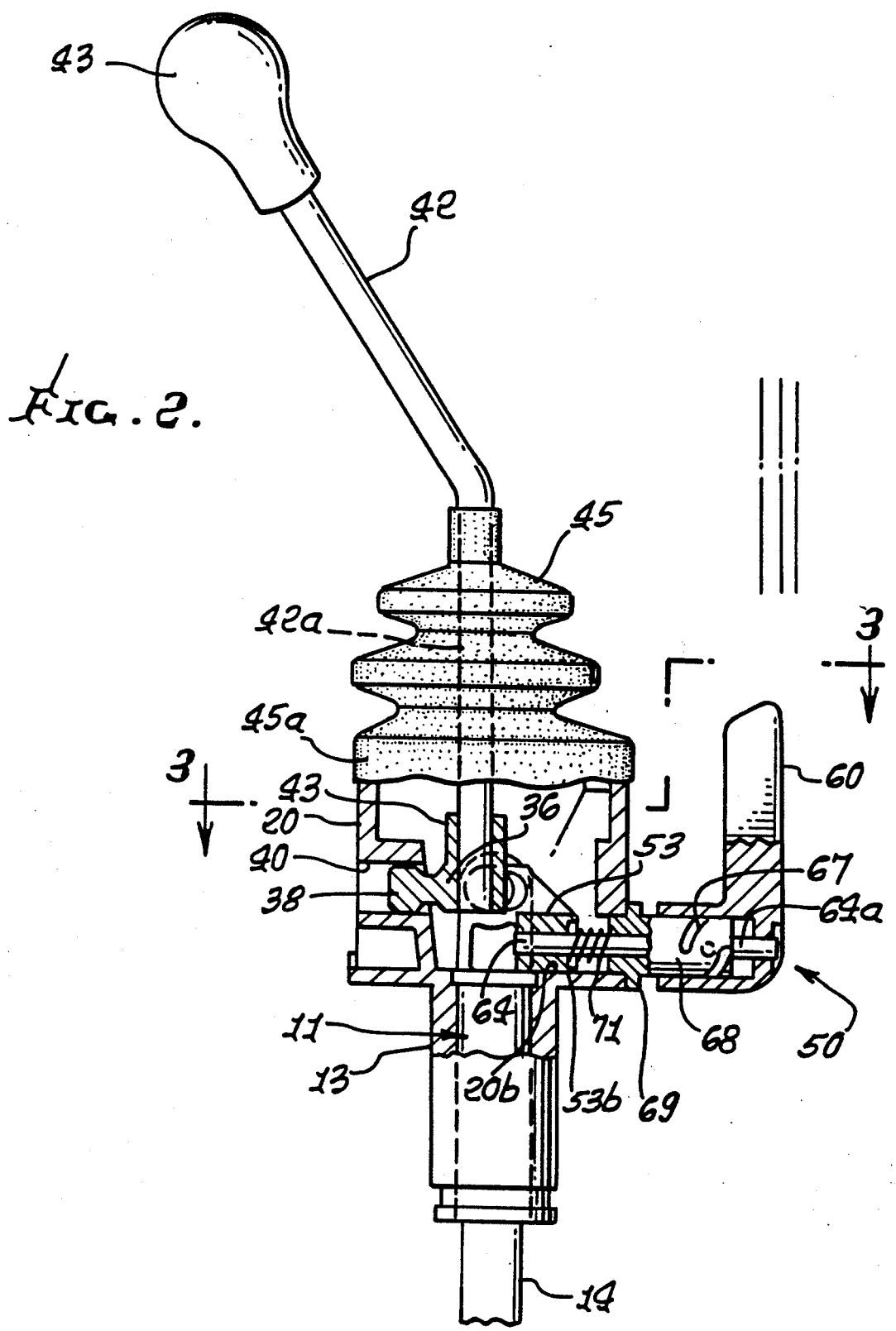
FIG. 2 is an elevation taken on lines 2—2 of FIG. 2 and partly broken away to show internal structure.
Figure 5:
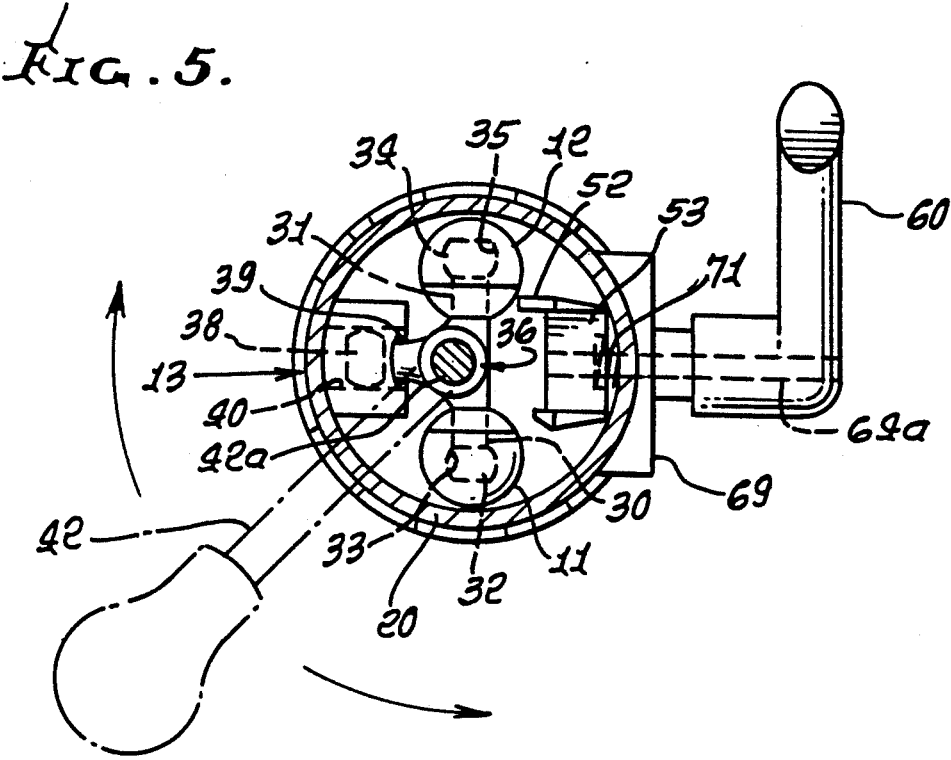
FIG. 5 is a view like FIG. 3 showing the locking handle and mechanism in an unlocked position.

Referring first to FIGS. 1, 2 and 5, the apparatus 10 is operable for selectively controlling endwise movement of two controlled members 11 and 12 carried within a housing 13 for endwise up and down, slidable movement. Member 11 is connected to a cable 14 that is movable back and forth to control a part 15 associated with device 16; and member 12 is connected with a cable 17 that is movable back and forth to displace a part 18 associated with 16. The parts 15 and 18 may be connected to valving such as may include a valve spool or spools, for controlling valve fluid, which in turn operates other equipment, as for example transmission 16. Other control equipment is of course usable. The valving structure is generally indicated at 19.

Referring to FIG. 8, the member 11 is carried within the body structure 20 having bore 21. The member 11 is biased toward a centered position by a pre-compressed coil spring 22 extending about the member 11. Thus, if the member 11 is displaced downwardly, a shoulder 23, pushes a sleeve 24 downwardly to compress spring 22. Note that the lower end of the spring is retained by a sleeve 24a prevented from being displaced downwardly by a ring 25 carried by body 20, the member 11 moving downwardly relative to the sleeve 24a. Conversely, if the member 11 is moved upwardly, a flange 23a, integral with the member 11, displaces sleeve 24a upwardly to compress the spring 22, sleeve 24 retaining the upper end of the spring, and being prevented from moving upwardly by the shoulder 26 on the body. Thus, member is slidable relative to sleeves 24 and 24a, and it is always urged toward a center position. In effect, the member 11 may have an up position, a down position, and a center position.

Actuator means is provided and coupled to the members 11 and 12 for selectively moving the two members longitudinally endwise, as for example to and from the up and down positions, as referred to. Such actuator means advantageously includes structure having a first tongue and groove connection with a first of the two control members, and a second tongue and groove connection with a second of the two control members. Note, for example, in FIGS. 5 and 8, the laterally extending actuator arm 30 connected with the upper end of member 11, and the oppositely laterally extending actuator arm 31 connected with the upper end of member 12. The first tongue and groove connection is shown in the form of a ball 32 on arm 30 received in a socket 33 in the upper end of member 11; and the second tongue and groove connection is shown in the form of a ball 34 on the end of arm 31 and received in a socket 35 in the upper end of member 12. The two arms are interconnected as by a transverse yoke 36. A pivot is provided for pivotly supporting the actuator means, whereby, when the actuator means is tilted in one direction, the first control member is moved downwardly and the second control member is moved upwardly; and when the actuator member is tilted in another direction, the first control member is moved upwardly and the second control member is moved downwardly. For example, note the pivot ball 38 on the yoke arm 39 received in a transverse pivot socket 40 integral with the body 20, to pivot in that socket and move transversely in that socket. See transversely extending arrows 100 in FIG. 8. Note that the arm 39 projects transversely sidewardly and generally normal to an axis extending between the bores 32 and 34 and passing through the arms 30 and 31. Accordingly, a rocking-type pivot is provided for the two arms 30 and 31, which are connected with the control members 11 and 12, as referred to.

The actuator means also may include an elongated handle 42 in the form of a lever having an upper end knob 43 which is manually controlled, the lever extending downwardly at an angle in the plane of FIG. 2 and then vertically at 42a into the body or housing 20, for reception into and connection to the sleeve 43, the latter being integral with the yoke 36 and the three arms 30, 31 and 39. FIG. 2 also shows a flexible bellows-type boot 45 connected with the lower end extent 42a of the control handle, and also extending about the upper open end of the housing, at 45a.

Also provided is a lock means 50 having structure selectively movable into locking relation with the members to selectively block endwise movement thereof. As shown, the lock means is advantageously selectively movable into locking relation with the actuator means for the members 11 and 12, proximate the tongue and groove connections referred to above. Considering FIGS. 4 and 10, the lock means has locking elements 51 and 52 shown in the form of hooks with recesses 51a and 52a facing toward the arms 30 and 31, respectively. The hooks are integral with a carrier 53, having a bore 54 facing toward the exterior of the housing. One of the hooks, for example hook 52, is sized to interlock with one arm, as for example arm 31, before the other of the hooks, i.e., hook 51, interconnects with the second arm 30, when the carrier 53 is moved sidewardly toward the arms. Accordingly, the locking means has a position as in FIG. 3, in which arm 31 and ball 34 are blocked against up and down movement; whereas arm 30 and ball 32, along with vertically elongated member 11, are not blocked against up and down movement, i.e., may be moved up and down by handle 42 as balls 34 and 38 pivot. When both hooks 51 and 52 are laterally displaced fully toward the arms 30 and 31, as in FIG. 4, both of the members 11 and 12 are blocked against up and down movement; and when both hooks are fully retracted to the right, as in FIG. 5, neither of the arms 30 and 31, nor members 11 and 12, is blocked against up and down movement, i.e., members 11 and 12 may be moved up and down by the handle 42, as ball 38 pivots and moves transversely in socket 40.

Figure 3:
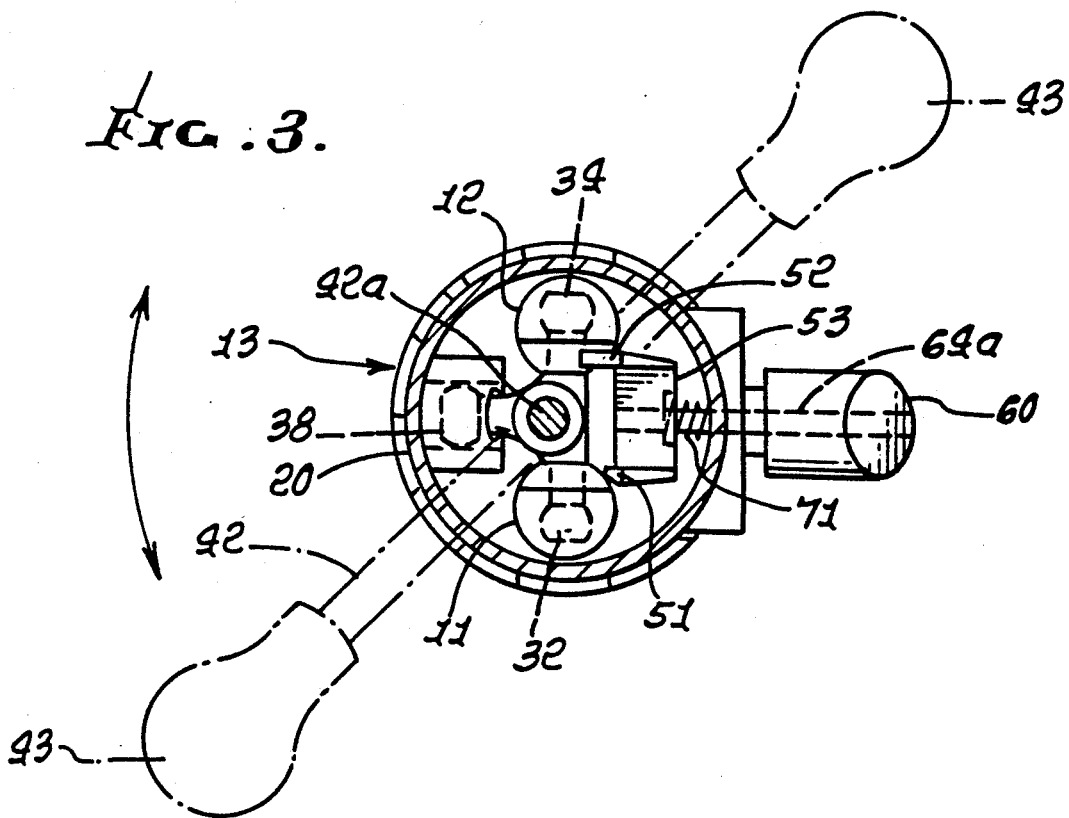
FIG. 3 is a plan view, partly in section, taken on lines 3—3 of FIG. 2.
Figure 4:
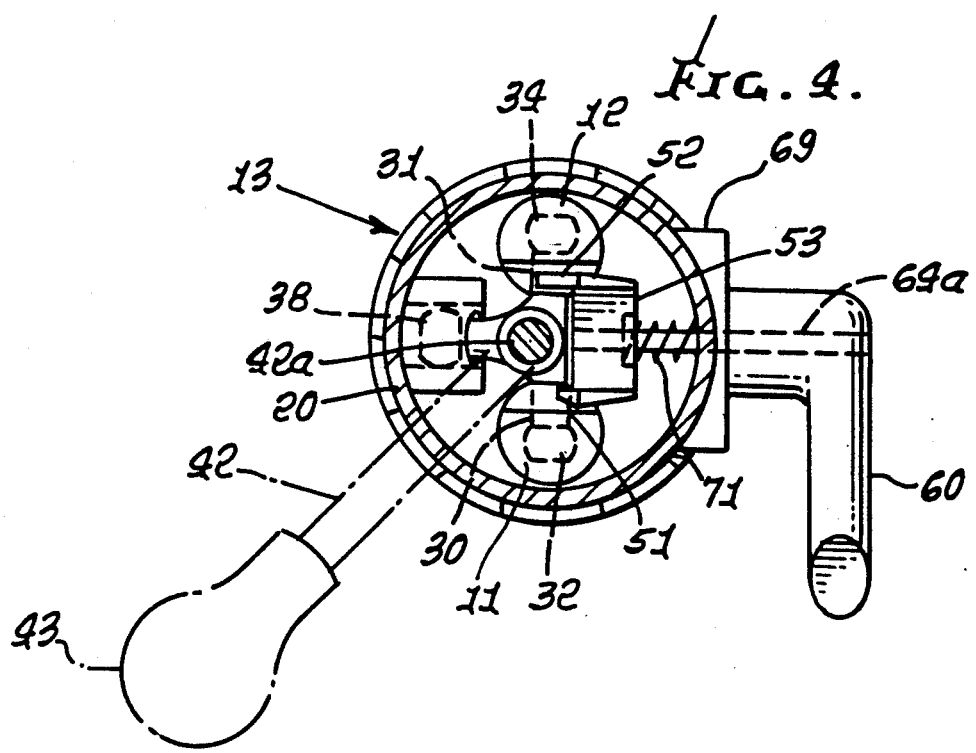
FIG. 4 is a view like FIG. 3 but showing a locking handle in a locked up position as regards the control mechanism.

The locking means 50 includes a crank handle 60 having a first position, as shown in FIG. 5 (no lock up); a second position, as shown in FIG. 3 (lock up of only one arm 31); and a third position, as shown in FIG. 4 (lock up of both arms 30 and 31). In this regard, motion transfer mechanism is provided for effected sideward movement of the locking elements 51 and 52, as described, in response to crank rotation of the arm 60 between its defined positions. Such motion transfer mechanism may include a carrier shaft portion 64 attached to the carrier 53 via bore 54, and projecting into the handle at 64a.

Figure 6:
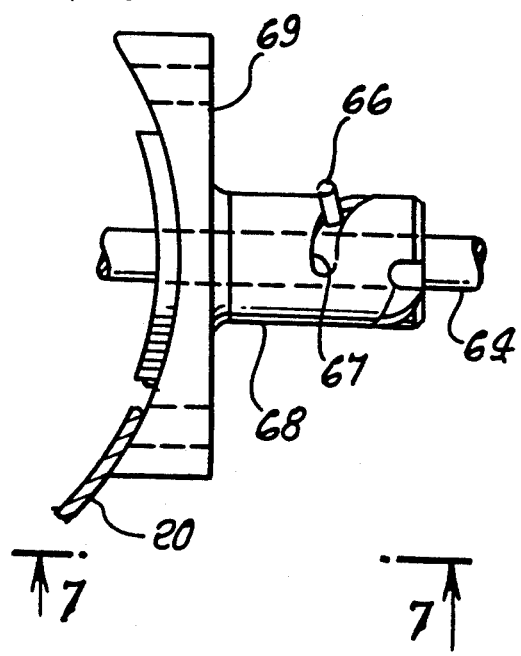
FIG. 6 is a plan view showing locking mechanism.
Figure 7:
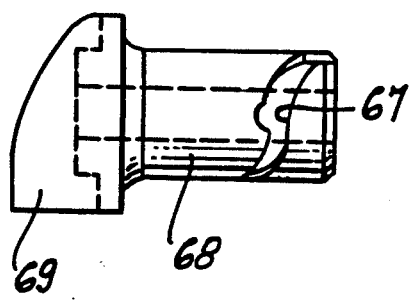
FIG. 7 is an elevation taken on lines 7—7 of FIG. 6.

A tang 66 on the shaft portion 64 (integral with handle 60) rotates with the shaft portion 64 as the handle is rotated, and causes the shaft portion 64 and carrier 53 to advance or retract sidewardly as the handle is rotated. The tang for this purpose feeds in a spiral cam slot 67 in a fixed sleeve 68. The sleeve is retained by plate 69 to the body 20, as seen in FIG. 6, whereby the slot 67 is fixed relative to that body. Suitable connection may be provided between the shaft portion 64 and the carrier 53, within bore 54, to allow shaft rotation relative to the carrier 53 as the carrier is advanced and retracted, as described. A compression spring 71 is provided between the carrier and the sleeve to urge the carrier toward the arms 30 and 31. Sliding or guiding of the carrier surface 53b on body transverse surface 20b prevents rotation of the carrier. See FIG. 2.

From the foregoing, it will be seen that the members 10 and 11 have the following possible positions as the input handle 42 is pivoted or rocked, and as the lock means 50 is positioned into selected positions as described (see FIG. 9):

a) both members displaced upwardly, b) both members displaced downwardly, c) one member displaced upwardly and the other member neutral, d) one member displaced downwardly and the other member neutral, e) one member neutral and the other member displaced upwardly, f) one member neutral and the other member displaced downwardly, g) one member displaced upwardly and the other member displaced downwardly, h) one member displaced downwardly and the other member displaced upwardly.

Accordingly, a very simple mechanism enables two control members 11 and 12 to be shifted into eight possible valve controlling positions, i.e., two flow controlling valve spools may have the possible relative positions as seen in the FIG. 9 table.

I claim:

1. In apparatus for selectively controlling endwise movement of two control members, the combination comprising
   a) body structure supporting said members for selective endwise movement thereof,
   b) actuator means coupled to said members for selectively moving the members endwise,
   c) and lock means selectively movable into locking relation with said members to selectively block endwise movement thereof,
   d) and wherein said actuator means includes actuator structure having a first tongue and groove connection with a first of said two control members, and a second tongue and groove connection with a second of said two control members.

2. The combination of claim 1 including a pivot on said body structure for pivotally supporting said actuator means whereby, actuator means tilting in one direction is accompanied by first control member movement downwardly and second control member movement upwardly; and actuator means tilting in another direction is accompanied by first control member movement upwardly and second control member movement downwardly.

3. The combination of claim 2 wherein said lock means is selectively movable into locking relation with said actuator means proximate said tongue and groove connections.

4. The combination of claim 3 wherein said lock means has locking elements for interlocking with arms defined by said actuator means structure, one of said elements sized to interlock with one arm before the other of said elements interlocks with another arm when the lock means elements are moved sidewardly toward said arms.

5. The combination of claim 4 wherein the locking means includes a handle having a first position in which neither of said locking elements interlock with said arms; a second position in which one of said elements interlocks with one of said arms; and a third position in which one of said arms interlocks with one of said arms, and the other of said arms interlocks with the other of said arms.

6. The combination of claim 5 wherein the locking means includes motion transfer mechanism for effecting sideward movement of said locking elements in response to rotation of said handle between said defined positions.

7. The combination of claim 6 wherein said motion transfer mechanism includes a carrier for said elements having a shaft portion movable sidewardly with said elements, a sleeve about said shaft portion and operatively connected to said handle, and a spiral tongue and groove connection between said sleeve and said shaft portion, the carrier mounted on the body structure for said sideward movement, and the handle also mounted on the body structure.

8. The combination of claim 1 wherein said lock means includes first and second elements movable sidewardly into locking relation with said members, said elements having spacing and being sized to provide a locking relation with one of said members while the other member remains free for endwise movement, and said elements being further movable to bring the other of said elements into locking relation with the other of said members.

9. The combination of claim 8 wherein said locking means includes a carrier for said elements, and a shaft portion, connected with the carrier, the locking means including a sleeve rotatable about the shaft portion and a rotary handle integral with the sleeve, there being a motion transfer mechanism between the sleeve and shaft portion to effect sideward displacement of the shaft portion and carrier in response to handle rotation.

10. The combination of claim 9 wherein said locking elements comprise hooks.

11. In apparatus for selectively controlling endwise movement of two control members, the combination comprising
    a) first means including body structure supporting said members for selective endwise movement thereof,
    b) actuator means coupled to said members for selectively moving the members endwise,
    c) and lock means selectively movable into locking relation with said members to selectively block endwise movement thereof,
    d) said lock means including first and second elements in the form of hooks movable sidewardly into locking relation with said members, said elements having spacing and being sized to provide a locking relation with one of said members while the other member remains free for endwise movement, and said elements being further movable to bring the other of said elements into locking relation with the other of said members,
    e) said lock means including a carrier for said elements, and a shaft portion, connected with the carrier, the lock means including a sleeve rotatable about the shaft portion and a rotary handle integral with the sleeve, there being a motion transfer mechanism between the sleeve and shaft portion to effect sideward displacement of the shaft portion and carrier in response to handle rotation,
    f) said actuator means including arms having tongue and groove connections with said members, said hooks movable into interlocking relation with the arms, respectively.

12. The combination of claim 11 wherein said actuator means includes an elongated handle connected with said arms, and there being pivot means on the body structure for pivotally mounting said handle, whereby handle pivoting effects controllable pivoting of said arms to selectively move said members endwise.

13. The combination of claim 12 wherein said pivot means includes a ball connected to and spaced from said arms, and a transverse socket integral with the body receiving the ball for pivoting in the socket and for transverse movement in the socket, as said members are displaced by said arms.

14. In apparatus for selectively controlling endwise movement of two control members, the combination comprising
    a) body structure supporting said members for selective endwise movement thereof,
    b) actuator means coupled to said members for selectively moving the members endwise,
    c) and lock means selectively movable into locking relation with said members to selectively block endwise movement thereof, d) said lock means including first and second elements in the form of hooks movable sidewardly into locking relation with said members, and elements having spacing and being sized to provide a locking relation with one of said members while the other member remains free for endwise movement, and said elements being further movable to bring the other of said elements into locking relation with the other of said members, e) said lock means including a carrier for said elements, and a shaft portion, connected with the carrier, the lock means including a sleeve rotatable about the shaft portion and a rotary handle integral with the sleeve, there being a motion transfer mechanism between the sleeve and shaft portion to effect sideward displacement of the shaft portion and carrier in response to handle rotation, f) said members having the following alternative positions:
  $x_1$) both members displaced upwardly,
  $x_2$) both members displaced downwardly,
  $x_3$) first member displaced upwardly and the second member neutral,
  $x_4$) first member displaced downwardly and the second member neutral,
  $x_5$) first member neutral and the second member displaced upwardly,
  $x_6$) first member neutral and the second member displaced downwardly,
  $x_7$) first member displaced upwardly and the second member displaced downwardly,
  $x_8$) first member displaced downwardly and the second member displaced upwardly, g) and including spring means for urging both of said members toward neutral position, said spring means carried by said body structure.

* * * * *